US010249869B2

United States Patent
Umehara et al.

(10) Patent No.: US 10,249,869 B2
(45) Date of Patent: Apr. 2, 2019

(54) METHOD OF PRODUCING ELECTRODE BODY AND METHOD OF PRODUCING BATTERY

(71) Applicant: TOYOTA JIDOSHA KABUSHIKI KAISHA, Toyota-shi, Aichi-ken (JP)

(72) Inventors: Masakazu Umehara, Toyota (JP); Takahiro Kuhara, Toyota (JP); Shingo Komura, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/602,710

(22) Filed: May 23, 2017

(65) Prior Publication Data

US 2017/0346067 A1 Nov. 30, 2017

(30) Foreign Application Priority Data

May 25, 2016 (JP) .................................. 2016-103924

(51) Int. Cl.
| | | |
|---|---|---|
| *H01M 4/04* | (2006.01) | |
| *H01M 4/62* | (2006.01) | |
| *H01M 4/139* | (2010.01) | |
| *H01M 4/36* | (2006.01) | |
| *H01M 10/052* | (2010.01) | |
| *H01M 10/0525* | (2010.01) | |
| *H01M 10/0587* | (2010.01) | |
| *H01M 10/0585* | (2010.01) | |

(52) U.S. Cl.
CPC ......... *H01M 4/0404* (2013.01); *H01M 4/139* (2013.01); *H01M 4/366* (2013.01); *H01M 4/62* (2013.01); *H01M 10/052* (2013.01); *H01M 10/0525* (2013.01); *H01M 10/0585* (2013.01); *H01M 10/0587* (2013.01)

(58) Field of Classification Search
CPC ...... H01M 4/0404; H01M 4/366; H01M 4/62; H01M 4/139; H01M 10/0585; H01M 10/052; H01M 10/0525; H01M 10/0587
USPC ....... 427/58, 79–80, 122, 123, 126.1, 126.3; 429/137, 209, 212–231.95
See application file for complete search history.

(56) References Cited

U.S. PATENT DOCUMENTS

| | | | |
|---|---|---|---|
| 2009/0067119 A1* | 3/2009 | Katayama ................ | H01G 9/02 361/523 |
| 2010/0221965 A1* | 9/2010 | Katayama ................ | H01G 9/02 442/59 |
| 2011/0281161 A1 | 11/2011 | Ikeda et al. | |

FOREIGN PATENT DOCUMENTS

| | | |
|---|---|---|
| JP | 11-339772 A | 12/1999 |
| JP | 2011-018594 A | 1/2011 |
| JP | 2013-084393 A | 5/2013 |
| JP | 5316905 B2 | 10/2013 |
| WO | 2007/066768 A1 | 6/2007 |

* cited by examiner

*Primary Examiner* — Dah-Wei D. Yuan
*Assistant Examiner* — Jose Hernandez-Diaz
(74) *Attorney, Agent, or Firm* — Sughrue Mion, PLLC

(57) ABSTRACT

A method of producing an electrode body includes obtaining a state in which an electrode active material layer in a wet state which includes a first solid component containing electrode active material particles and a first liquid phase component and which includes the first solid component at a weight ratio in a range of 70 to 85% is present on the collecting foil, and applying an insulating particle paint which includes a second solid component containing insulating particles and a second liquid phase component and which includes the second solid component at a weight ratio in a range of 35 to 50% onto the electrode active material layer in the wet state, wherein a surface tension value of the first liquid phase component is in a range of 90 to 110% of a surface tension value of the second liquid phase component.

6 Claims, 4 Drawing Sheets

# METHOD OF PRODUCING ELECTRODE BODY AND METHOD OF PRODUCING BATTERY

INCORPORATION BY REFERENCE

The disclosure of Japanese Patent Application No. 2016-103924 filed on May 25, 2016 including the specification, drawings and abstract is incorporated herein by reference in its entirety.

BACKGROUND

1. Technical Field

The present disclosure relates to a method of producing an electrode body in which positive and negative electrode plates are laminated and which serves as a power generating element of a battery. A method of producing a battery using the electrode body is also provided.

2. Description of Related Art

A separator is sandwiched between positive and negative electrode plates in an electrode body of a battery. In recent years, the use of an insulating particle layer that has already been formed on a surface of one electrode plate as the separator has been proposed. One example is disclosed in Japanese Patent Application Publication No. 2013-084393 (JP 2013-084393 A) (title of the invention: method of producing lithium ion secondary battery). In the technology of JP 2013-084393 A ([0030] to [0042]), a slurry obtained by mixing an electrode active material, other solid components, and a liquid phase component is applied to a surface of a collecting foil and drying and press processing are additionally performed thereon. An insulating particle paint with a solid content ratio of 35 to 39 weight % is applied to the electrode plate obtained in this manner to obtain an electrode plate having a separator layer. An electrode plate having a separator layer (a negative electrode) and an electrode plate having no separator layer (a positive electrode) are laminated to obtain an electrode body.

SUMMARY

However, in the electrode body of the battery described above, the wettability of an insulating particle paint when the insulating particle paint is applied to an electrode plate is not favorable. Therefore, the applied insulating particle paint is repelled by an electrode active material layer of the electrode plate, which results in a coating defect in some cases. As a result, it was not possible to obtain a separator layer (an insulating particle layer) with a uniform thickness.

The present disclosure provides a method of producing an electrode body and a method of producing a battery through which it is possible to improve the wettability of an insulating particle paint on an electrode active material layer and form and sandwich an insulating particle layer with a uniform thickness between positive and negative electrode plates.

A method of producing an electrode body according to an aspect of the present disclosure is a method of producing an electrode body in which a first electrode plate having a structure including an electrode active material layer on a surface of a collecting foil and an insulating particle layer on a surface of the electrode active material layer, and a second electrode plate are laminated to obtain an electrode body of a battery. The first aspect of the present disclosure includes obtaining a state in which the electrode active material layer in a wet state which includes a first solid component containing electrode active material particles and a first liquid phase component that is volatilized by drying, a weight ratio of the first solid component in the electrode active material layer in the wet state being in a range of 70 to 85%, is present on the collecting foil and applying an insulating particle paint which includes a second solid component containing insulating particles and a second liquid phase component that is volatilized by drying, a weight ratio of the second solid component in the insulating particle paint being in a range of 35 to 50%, onto the electrode active material layer in the wet state, wherein a surface tension value of the first liquid phase component is in a range of 90 to 110% of a surface tension value of the second liquid phase component.

In the above production method, at first, a state in which the electrode active material layer in the wet state is present on the collecting foil is obtained. The electrode active material layer in the wet state includes the first liquid phase component at a weight ratio in a range of 15 to 30%. In addition, the insulating particle paint is applied onto the electrode active material layer in the wet state. The insulating particle paint includes the second liquid phase component at a weight ratio in a range of 50 to 65%. Since the electrode active material layer serving as a lower layer is in a wet state and affinity between the liquid phase components is favorable, the wettability of the insulating particle paint on the surface is favorable. Accordingly, the first electrode plate including a favorable insulating particle layer having no defect and having no thickness nonuniformity is obtained. Therefore, a high quality electrode body is obtained. Moreover, the "a surface tension value of the first liquid phase component is in a range of 90 to 110% of a surface tension value of the second liquid phase component" includes a combination in which a first liquid phase component and a second liquid phase component are liquids of the same type.

According to the production method, when the insulating particle paint is applied onto the electrode active material layer in the wet state, a contact angle of the insulating particle paint on the electrode active material layer in the wet state may be in a range of 10 to 40°. This is because, when the contact angle exceeds 40°, the insulating particle paint tends to be repelled on the electrode active material layer. Therefore, a defect or thickness nonuniformity is likely to occur in the insulating particle layer. On the other hand, when the contact angle is less than 10°, the liquid phase components are too attracted to each other which causes the electrode active material layer and the insulating particle layer to mix. When the contact angle is in the above range, there is no adverse effect.

According to the production method, when the state in which the electrode active material layer in the wet state is present on the collecting foil is obtained, an electrode active material paint which includes a first solid component and a first liquid phase component and which includes the first solid component at a weight ratio in a range of 70 to 85% may be applied onto a collecting foil to form the electrode active material layer in the wet state, and the insulating particle paint may be then applied onto the electrode active material layer in the wet state without a process of intentionally decreasing the first liquid phase component included in the electrode active material layer in the wet state. In this manner, since no process of intentionally decreasing the first liquid phase component included in the electrode active material layer in the wet state is performed after obtaining the state in which the electrode active material layer in the wet state is present on the collecting foil, the number of processes is reduced.

According to the production method, when the first electrode plate and the second electrode plate are laminated, the insulating particle layer and the second electrode plate may face each other without another member sandwiched between the insulating particle layer and the second electrode plate. This is because a favorable insulating particle layer having no defect and having no thickness nonuniformity is formed as described above. Therefore, the electrode active material layer of the first electrode plate is not directly in contact with the second electrode plate.

According to the production method, when the first electrode plate and the second electrode plate are laminated, the insulating particle layer and the second electrode plate may face each other with a film separator sandwiched between the insulating particle layer and the second electrode plate. In this case also, thickness uniformity of the insulating particle layer is high, which is advantageous in that the shape of the electrode body is stable.

According to the production method, the first electrode plate may be a negative electrode plate of a lithium ion battery and the second electrode plate may be a positive electrode plate of the lithium ion battery. In addition, another aspect of the present disclosure is a method of producing a battery in which an electrode body is accommodated in a battery case together with an electrolyte solution and sealed. In the method of producing a battery, an electrode body produced using the method of producing an electrode body according to any one of the above aspects is used as the electrode body.

According to this configuration, there are provided a method of producing an electrode body and a method of producing a battery through which it is possible to improve the wettability of an insulating particle paint on an electrode active material layer and form and sandwich an insulating particle layer with a uniform thickness between positive and negative electrode plates.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
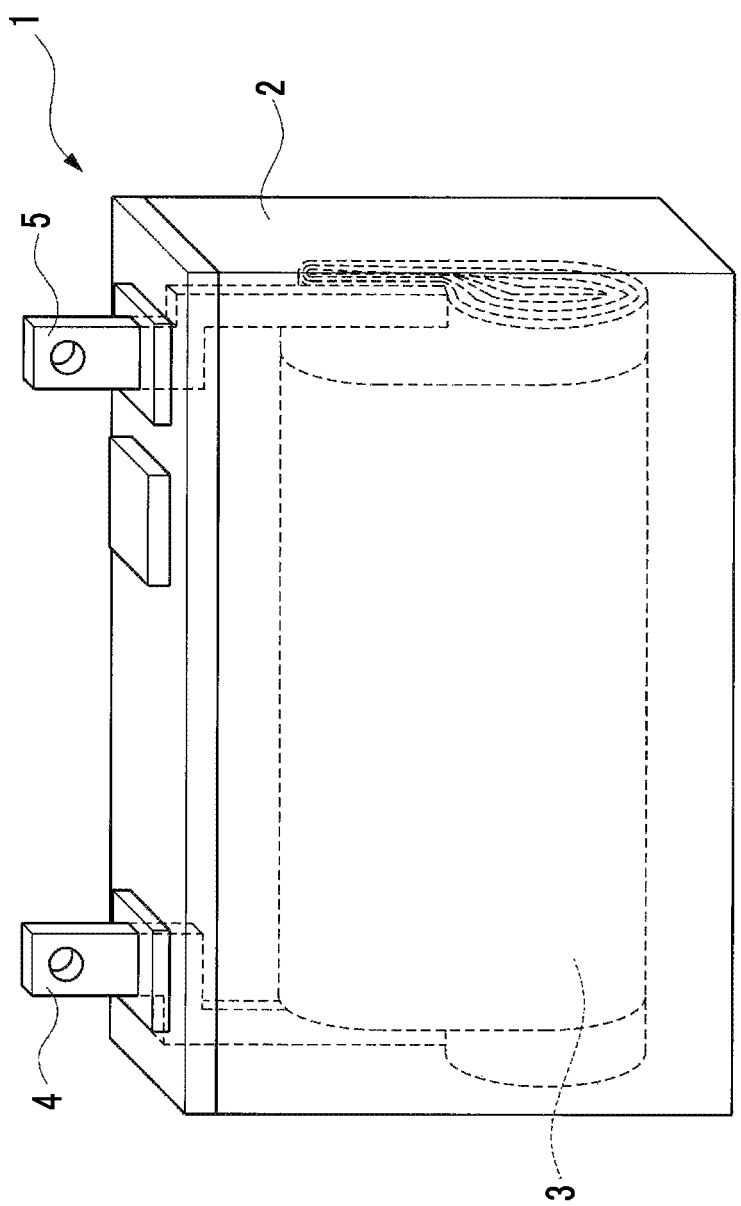
FIG. 1 is a perspective view showing a perspective interior of a battery into which an electrode body produced according to a production method of an embodiment is built.

Concrete embodiments of the present disclosure will be described in detail below with reference to the accompanying drawings. The present embodiment is a method of producing an electrode body of a lithium ion battery and realizes the present disclosure. First, a schematic diagram of a lithium ion battery that is a finally completed form is shown (FIG. 1). In a lithium ion battery 1 shown in FIG. 1, an electrode body 3, which is a power generating element, is built into a battery case 2. Positive and negative terminal members 4 and 5 are provided to penetrate the battery case 2. The electrode body 3 is formed by alternately laminating positive and negative electrode plates to be described below. An electrolyte solution is impregnated into the electrode body 3.

Figure 2:
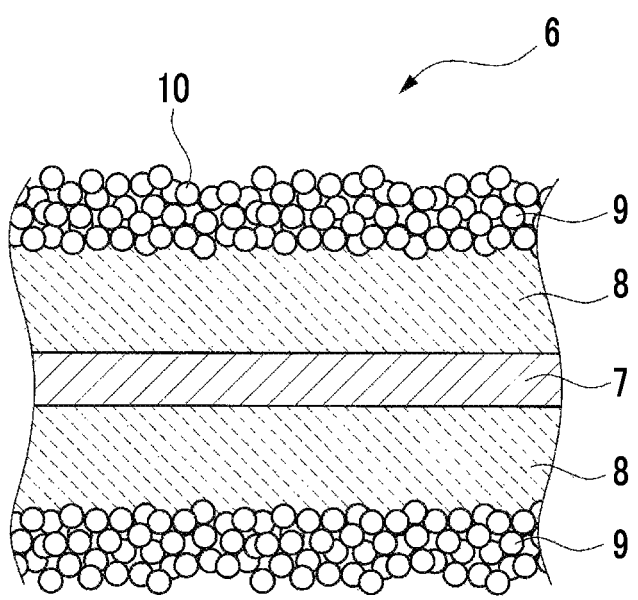
FIG. 2 is a cross-sectional view schematically showing a structure of an electrode plate having an insulating particle layer used in the production method of the embodiment.

When the electrode body 3 in the present embodiment is produced, between a positive electrode plate and a negative electrode plate, as the negative electrode plate, a plate having an insulating particle layer is used. A cross-sectional structure of a negative electrode plate 6 having an insulating particle layer is shown in FIG. 2. The negative electrode plate 6 having an insulating particle layer in FIG. 2 includes an electrode active material layer 8 on both surfaces of a collecting foil 7. Further, an insulating particle layer 9 is formed on surfaces of both electrode active material layers 8. As the collecting foil 7, for example, a collecting foil described in [0034] and [0061] in Japanese Patent Application Publication No. 2011-018594 (JP 2011-018594 A) (hereinafter referred to as a "prior document") can be used.

The insulating particle layer 9 is a layer that is formed by depositing fine particles 10 of an insulating material. As the insulating material that can be used as the fine particles 10 of the insulating particle layer 9, for example, ceramic particles such as alumina and boehmite and resin particles such as polyethylene and polypropylene may be exemplified. In addition, a material described in [0037] in the prior document can be used. A binding agent and other additives (for example, those described in [0039] in the prior document) are additionally included in the insulating particle layer 9.

The electrode active material layer 8 is a layer including an electrode active material and various additives. Although drawn succinctly in FIG. 2, the electrode active material layer 8 is also an aggregate of fine particles as will be described below. As a (negative) electrode active material that can be used as a material of the electrode active material layer 8, for example, a material described in [0030] in the prior document may be exemplified. As the additive, for example, an additive described in [0032] in the prior document may be exemplified.

The quality of a material of a second electrode plate used in the present embodiment, that is, a positive electrode plate, is different, but structurally, both surfaces of the insulating particle layer 9 are removed from the negative electrode plate 6 having an insulating particle layer shown in FIG. 2. That is, the positive electrode plate has a structure including an electrode active material layer on both surfaces of the collecting foil. As a (positive) electrode active material that can be used as a material of the electrode active material layer of the positive electrode plate, for example, a material described in [0061] in the prior document may be exemplified.

A feature of the production method of the electrode body 3 according to the present embodiment is a process of producing the negative electrode plate 6 having an insulating particle layer. In the present embodiment, the negative electrode plate 6 having an insulating particle layer is produced in the following two-step coating process.

1. First process . . . coating for forming the electrode active material layer 8 on the collecting foil
2. Second process . . . coating for forming the insulating particle layer 9 on the electrode active material layer 8.

First, the first process will be described. In the first process, an electrode active material paint obtained by mixing and kneading powders of a material of the electrode active material layer 8 with a liquid phase component is applied onto a surface of the collecting foil 7. The electrode active material paint is a paint in the form of a paste including a solid component and a liquid phase component. As described above, the solid component includes powders of a binding agent, a conductive agent and other additives in addition to powders of the (negative) electrode active material. The liquid phase component is a component which is in a liquid phase at normal temperatures and at least the majority of which is volatilized by drying and does not remain in the electrode active material layer 8. The liquid phase component should be a liquid which does not particularly react with a solid component. Specifically, for example, a component described in [0031] in the prior document can be used. Also, among source materials of the electrode active material paint, all of the nonvolatile components that remain in the electrode active material layer 8 after drying are included in the solid component.

In the first process of the present embodiment, the electrode active material layer 8 that includes the solid component at a weight ratio (hereinafter referred to as a "solid content ratio") in a range of 70 to 85% on the surface of the collecting foil 7 is obtained. That is, the electrode active material layer 8 obtained in the first process is in a so-called wet state in which a liquid phase component is contained at a weight ratio in a range of 15 to 30%. As a method of obtaining a state in which the electrode active material layer 8 in such a wet state is present on the surface of the collecting foil 7, the following two methods are provided. The first method is a method in which an electrode active material paint with a target solid content ratio is prepared and the electrode active material paint is applied to the collecting foil 7. The second method is a method in which an electrode active material paint with a lower solid content ratio than the target solid content ratio is applied to the collecting foil 7, and is then lightly dried so that a solid content ratio of the electrode active material layer 8 is adjusted to be within a target range.

In the first method, an electrode active material paint is produced at a component ratio at which a solid content ratio is in a range of 70 to 85%. Then, the electrode active material paint is applied to the collecting foil 7. Therefore, the electrode active material layer 8 in the above-described wet state on the surface of the collecting foil 7 is obtained. Then, the above-described second process is performed without a process of intentionally drying the electrode active material layer 8 such as heating or air blowing. The second process itself will be described below. In the first method, no drying process is performed between the coating in the first process and the coating in the second process. Therefore, there is an advantage that the entire process is simplified accordingly and productivity is favorable.

In the second method, an electrode active material paint is produced at a component ratio that is a lower solid content ratio than that in the first method. For example, a solid content ratio of an electrode active material paint to be produced is about 55 to 70%. Then, the electrode active material paint is applied to the collecting foil 7. Therefore, the electrode active material layer 8 containing an excessive liquid phase component is formed on the surface of the collecting foil 7. Then, a light drying process is performed. That is, a liquid phase component in the electrode active material layer 8 is reduced by a certain degree of heating or air blowing. Therefore, a state in which the electrode active material layer 8 in the moderately wet state described above is present on the surface of the collecting foil 7 is obtained. Then, the above-described second process is performed.

In the second method, there is an advantage that a solid content ratio of the electrode active material layer 8 immediately before the material is provided in the second process can be controlled more precisely. Here, a solid content ratio of the electrode active material layer 8 applied to the collecting foil 7 can be measured through known infrared absorption measurement. This is because an absorption band wavelength of a main liquid used as a liquid phase component in the electrode active material layer 8 is already known. However, this does not mean that infrared absorption measurement should always be performed. Once conditions of the above-described light drying process can be set, there is basically no need to perform infrared absorption measurement thereafter.

In the second process of the present embodiment, an insulating particle paint obtained by mixing and kneading the fine particles 10 which are materials of the insulating particle layer 9 with a liquid phase component is applied onto the surface of the electrode active material layer 8 in the above-described wet state (wet on semi-dry). The insulating particle paint is a paint in the form of a paste including a solid component and a liquid phase component, which is the same as the above-described electrode active material paint. However, it is needless to say that the solid component of the insulating particle paint mainly includes the above-described fine particles 10 and the above-described additive. The liquid phase component of the insulating particle paint is a liquid of the same type as the liquid phase component of the electrode active material paint or a liquid having a similar surface tension.

In the second process of the present embodiment, an insulating particle paint is produced at a component ratio at which a solid content ratio is in a range of 35 to 50%. Then, the insulating particle paint is applied onto a surface of the electrode active material layer 8. In this case, the electrode active material layer 8 serving as a lower layer is in the above-described wet state. That is, a liquid phase component of a considerable degree is included. In addition, affinity between the liquid phase component of the lower layer and the liquid phase component of the insulating particle paint is high. Therefore, the wettability of the insulating particle paint on the lower layer is high.

Therefore, a contact angle of the insulating particle paint on the lower layer can be set to a lower angle and specifically can be set in a range of 10 to 40°. Since coating is performed at such a suitable contact angle, the following advantages are obtained. That is, the insulating particle layer 9 formed as an upper layer by coating becomes a favorable coating layer having no defect and having high thickness uniformity. Also, a contact angle of the insulating particle paint on the lower layer can be directly measured from an enlarged image of a part in which the lower layer and the insulating particle paint come in contact which is observed from the side.

Figure 3:
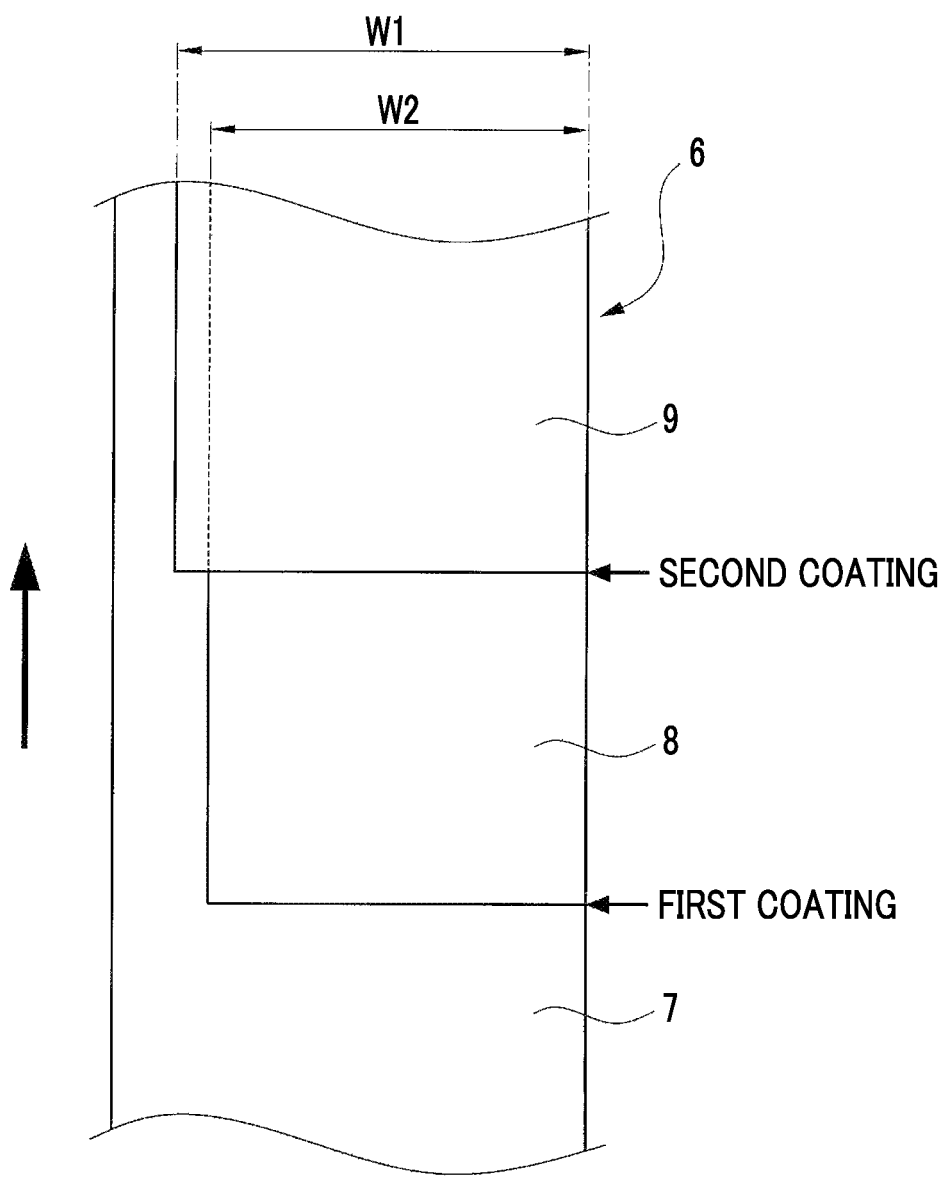
FIG. 3 is a plan view schematically showing a relation between coating widths of an upper layer and a lower layer in the production method of the embodiment.

Here, as shown in FIG. 3, a coating width W1 of the upper layer (the insulating particle layer 9) is set to be greater than a coating width W2 of the lower layer (the electrode active material layer 8). The reason for this is to prevent the electrode active material layer 8 from being in directly contact with the positive electrode plate when the negative electrode plate 6 having an insulating particle layer and the positive electrode plate are superimposed to form the electrode body 3.

Figure 4:
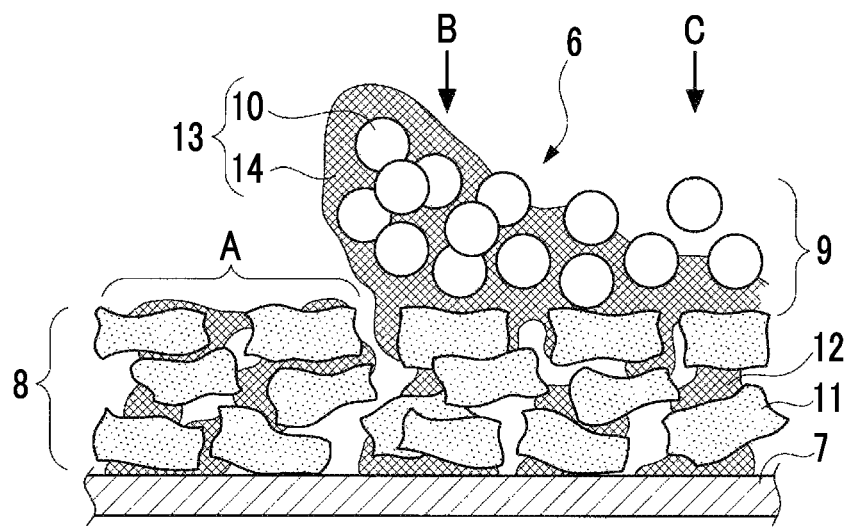
FIG. 4 is a cross-sectional view schematically showing a condition when an upper layer is coated (a second process) in the production method of the embodiment.

A condition when the upper layer is coated is schematically shown in FIG. 4. In FIG. 4, the part A shows a condition when coating in the second process has not yet been performed, and the part B shows a condition of a part in which coating in the second process is actually performed. The vicinity of C shows a condition in which a liquid phase component starts to decrease according to the subsequent drying process. In FIG. 4, electrode active material particles 11 and a liquid phase component 12 in the electrode active material layer 8 drawn succinctly in FIG. 2 are schematically shown. Also, as described above, while an additive in addition to the electrode active material is included in the electrode active material layer 8, it is not distinguished from the electrode active material particles 11 in the drawing shown as FIG. 4. In addition, an insulating particle paint 13 shown in FIG. 4 includes the above-described fine particles 10 and a liquid phase component 14. Also, in FIG. 4, a sparser accumulation condition of the fine particles 10 in the insulating particle layer 9 than the actual condition is drawn.

As shown in FIG. 4, at a time point immediately before coating in the second process, a certain degree of the liquid phase component 12 is present in the electrode active material layer 8 and is in a wet state. Accordingly, affinity between the electrode active material layer 8 and the insulating particle paint 13 supplied thereon is favorable. Therefore, the favorable insulating particle layer 9 having no defect and having high thickness uniformity is obtained.

However, this result is not obtained if a liquid phase component of the electrode active material layer 8 is insufficient when coating in the second process is performed, that is, if the solid content ratio is too high (wet on dry). In this case, since the electrode active material layer 8 is slightly dry, the contact angle is too large, and the insulating particle paint 13 is repelled. Therefore, the condition of forming the insulating particle layer 9 is not so favorable. Specifically, a defect (an uncoated part) is formed or a film thickness differs locally. In this manner, a low quality insulating particle layer 9 is formed. In the present embodiment, there is no such case. In addition, even if a solid content ratio of the electrode active material layer 8 is appropriate, when a solid content ratio of the insulating particle paint 13 applied thereon is too high, the same result is obtained. This is because a viscosity of the insulating particle paint 13 is too high. In the present embodiment, there is no such case.

Figure 5:
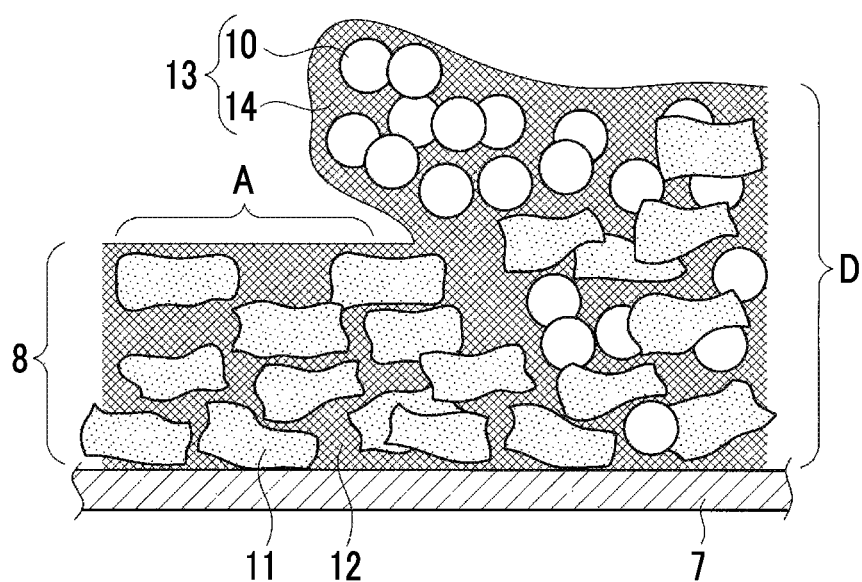
FIG. 5 is a cross-sectional view schematically showing a condition if a solid content ratio of a lower layer when an upper layer is coated is too low.

On the other hand, if a liquid phase component of the electrode active material layer 8 is excessive when coating in the second process is performed, that is, when a solid content ratio is too low (wet on wet), there is another deficit. In this case, there is no problem of poor affinity between the electrode active material layer 8 and the insulating particle paint 13, but the electrode active material layer 8 and the insulating particle paint 13 are mixed after the insulating particle paint 13 is coated (refer to D in FIG. 5). This is because a liquidity of the electrode active material layer 8 is too high. Therefore, a structure in which the electrode active material layer 8 and the insulating particle layer 9 are not clearly separated is obtained. Such a structure is inappropriate as an electrode plate of a battery. In a condition in which such a case occurs, the above-described contact angle is too low. In the present embodiment, there is no such case. In addition, even if a solid content ratio of the electrode active material layer 8 is appropriate, when a solid content ratio of the insulating particle paint 13 applied thereon is too low, the same result is obtained. This is because a viscosity of the insulating particle paint 13 is too low. In the present embodiment, there is no such case.

The negative electrode plate 6 having an insulating particle layer on which the insulating particle layer 9 is favorably formed in the second process is then subjected to a drying process. Therefore, the liquid phase components 12 and 14 are removed from the electrode active material layer 8 and the insulating particle layer 9. Moreover, the negative electrode plate 6 having an insulating particle layer is laminated with the positive electrode plate to form the electrode body 3 shown in FIG. 1. In this case, there is no need to sandwich a film separator between the electrode plates. This is because the negative electrode plate 6 having an insulating particle layer in which the favorable insulating particle layer 9 is formed as described above is used as a negative electrode plate. Therefore, direct contact between the electrode active material layers does not occur even if no film separator is used. However, a (porous) film separator may be sandwiched. In this case also, there are advantages in that the insulating particle layer 9 has high thickness uniformity and the shape of the laminated electrode body 3 is stable. When the electrode body 3 obtained in this manner is accommodated in the battery case 2 together with the electrolyte solution and sealed, the lithium ion battery 1 is obtained.

Also, the electrode body 3 shown in FIG. 1 has a so-called flat wound type, but the form of the electrode body 3 is not limited thereto. The electrode body 3 may have a cylinder wound type, a card laminated type, or a zigzag type. In addition, the insulating particle layer 9 may be formed on the positive electrode plate instead of the negative electrode plate. Alternatively, the insulating particle layer 9 may be formed on both of the positive electrode plate and the negative electrode plate. In addition, the coating process itself may be performed on the upper layer and the lower layer by a known coating device such as a die coating or gravure coating device.

Here, a relation between the liquid phase component 12 of the electrode active material paint and the liquid phase component 14 of the insulating particle paint 13 will be described. As described above, affinity between the liquid phase components needs to be high. Specifically, both liquid phase components have the same type or have different types with a similar surface tension. A surface tension of a liquid can be measured by a drop type method or other methods and can be identified based on lists released by various measuring instrument manufacturers and reagent manufacturers. As such a list, for example, there is a "solvent characteristic table" which is released in the commercial site "Net-On" for measuring instruments and optical instruments. Some values of surface tensions shown in the list are shown in Table 1.

TABLE 1

| Solvent name | Surface tension (dyne/cm) |
|---|---|
| Isopropyl alcohol | 20.8 (25° C.) |
| Isopropyl ether | 17.7 (20° C.) |
| Acetone | 23.3 (20° C.) |
| Normal hexane | 18.4 (20° C.) |
| Cyclohexane | 25.3 (20° C.) |

In addition, although not shown in Table 1, surface tension values of water (often used for a negative electrode) and NMP (N-methyl-2-pyrrolidone, often used for a positive electrode) which are actually frequently used as a kneading solvent are known as follows.

Water - - - 72.75 dynes/cm (Source: Tokyo Electro-Plating Industrial Association website)

NMP - - - 33.7 dynes/cm (Source: Midas Chemical website)

In addition, it is generally known that the surface tension of a liquid is weaker as the temperature is higher. For example, in the Tokyo Electro-Plating Industrial Association website, surface tension values of water at respective temperatures are shown in a table Based on such known information, a liquid having a surface tension value similar to that of a temperature when coating in the second process is performed may be selected. It should be noted that the surface tension of a liquid may be measured by any measuring instrument and selection may be performed based on the measured value. If one value is in a range of 90 to 110% of the other value, the value of the surface tension may be considered to be similar. Also, the liquid is preferably selected in consideration of low reactivity with a solid component and easiness of drying in addition to the surface tension.

Examples and comparative examples will be described below. In the present example, an insulating particle layer was formed on a negative electrode plate and water was used as a liquid phase component of the electrode active material paint and a liquid phase component of the insulating particle paint. A lithium-nickel-manganese-cobalt composite oxide was used as the negative electrode active material and polyethylene particles were used as fine particles of the insulating material. A copper foil was used as the collecting foil. Examples 1 to 9 are shown in Table 2 and Comparative Examples 1 to 8 are shown in Table 3.

TABLE 2

| | Solid content ratio | | Contact | | |
|---|---|---|---|---|---|
| | Lower layer | Upper layer | angle | Repelling | Mixed |
| Example 1 | 70 | 35 | 10° | No | No |
| Example 2 | | 42 | 13° | | |
| Example 3 | | 50 | 17° | | |
| Example 4 | 77 | 35 | 19° | | |
| Example 5 | | 42 | 23° | | |
| Example 6 | | 50 | 25° | | |
| Example 7 | 85 | 35 | 27° | | |
| Example 8 | | 42 | 35° | | |
| Example 9 | | 50 | 40° | | |

The column of "solid content ratio" in Table 2 is a column showing weight ratios of solid components in the "lower layer" and the "upper layer" when coating in the second process is performed. The "lower layer" is a (negative) electrode active material layer formed by coating in the first process. The "upper layer" is an insulating particle paint applied thereon. In all of Examples 1 to 9, the solid content ratio of the lower layer is in a range of 70 to 85% and the solid component of the upper layer is in a range of 35 to 50%.

The column of "contact angle" in Table 2 is a column showing contact angles of insulating particle paints on a surface of the (negative) electrode active material layer serving as the lower layer. Here, values obtained by directly measuring contact angles from enlarged images of contact parts which are observed from the side are shown. In all of Examples 1 to 9, the contact angle is in a range of 10 to 40°. The column of "repelling" is a column indicating whether the insulating particle paint was repelled on the surface of the electrode active material layer. Here, coating parts were visually observed to determine whether repelling occurred. In all of Examples 1 to 9, no repelling occurred. The column of "mixed" is a column indicating whether the electrode active material layer and the insulating particle layer serving as the upper layer were mixed (refer to D in FIG. 5). Here, the drying process was performed after coating in the second process. Then, a cross section was observed under a microscope to determine whether mixing occurred in the observed image. Even when mixing was partially observed, it was determined as "yes." In all of Examples 1 to 9, no mixing was observed.

TABLE 3

| | Solid content ratio | | Contact | | | |
|---|---|---|---|---|---|---|
| | Lower layer | Upper layer | angle | Repelling | Mixed | Condition |
| Comparative Example 1 | *86* | 35 | *60°* | Yes | No | Insufficient moisture in a lower layer→large contact angle→repelling |
| Comparative Example 2 | *100* | | *88°* | | | |
| Comparative Example 3 | *69* | 50 | *9°* | No | Yes | Excess moisture in a lower layer→small contact angle→mixed |
| Comparative Example 4 | *60* | | *7°* | | | |
| Comparative Example 5 | 85 | *34* | *8°* | | | Excess moisture in an upper layer→small contact angle→mixed |
| Comparative Example 6 | 70 | *51* | *41°* | Yes | No | Insufficient moisture in an upper layer→large contact angle→repelling |
| Comparative Example 7 | *69* | 35 | *8°* | No | Yes | Excess moisture in a lower layer→small contact angle→mixed |

TABLE 3-continued

|  | Solid content ratio | | Contact angle | Repelling | Mixed | Condition |
|---|---|---|---|---|---|---|
|  | Lower layer | Upper layer | | | | |
| Comparative Example 8 | *86* | 50 | *57°* | Yes | No | Insufficient moisture in a lower layer→large contact angle→ repelling |

The meanings of the columns of "solid content ratio," "contact angle," "repelling," and "mixed" in Table 3 are the same as those in Table 2. However, in Table 3, when the results are outside a preferable range or not favorable, they are indicated in bold italic characters. In Comparative Examples 1, 2, and 8, the solid content ratio of the lower layer was set to be too high. Among them, in Comparative Example 2, the drying process was performed before coating in the second process after coating in the first process was performed and a liquid phase component in the lower layer was completely removed. On the other hand, in Comparative Examples 3, 4, and 7, the solid content ratio of the lower layer was set to be too low. In Comparative Example 5, the solid content ratio of the upper layer was set to be too low. In Comparative Example 6, the solid content ratio of the upper layer was set to be too high. That is, in Comparative Examples 1 to 8, in either the upper layer or the lower layer, the solid content ratio was outside a preferable range.

In all of Comparative Examples 1 to 8, the contact angle was outside a preferable range thereof. That is, the contact angle was too large in Comparative Examples 1, 2, 6, and 8, and the contact angle was too small in Comparative Examples 3 to 5, and 7. In addition, in Comparative Examples 1, 2, 6, and 8, "repelling" occurred. In Comparative Examples 3 to 5 and 7, "mixed" was observed. That is, in all of Comparative Examples 1 to 8, a defect of either "repelling" or "mixed" occurred.

The column of "condition" in Table 3 describes an (assumed) condition that resulted in a defect of "repelling" or "mixed." In Comparative Examples 1, 2, and 8, coating in the second process was performed while moisture in the lower layer was too small. Therefore, the contact angle of the insulating particle paint on a surface of the lower layer was large, which was considered to cause the occurrence of "repelling." In Comparative Examples 3, 4, and 7, coating in the second process was performed while moisture in the lower layer was too large. Therefore, the contact angle of the insulating particle paint on a surface of the lower layer was small, which was considered to cause the occurrence of "mixed."

In Comparative Example 5, coating in the second process was performed using an insulating particle paint containing excessive moisture. Such an insulating particle paint was considered to have a low viscosity. Therefore, the contact angle of the insulating particle paint on a surface of the lower layer was small, which was considered to cause the occurrence of "mixed." In Comparative Example 6, coating in the second process was performed using an insulating particle paint containing insufficient moisture. Such an insulating particle paint was considered to have a high viscosity. Therefore, the contact angle of the insulating particle paint on a surface of the lower layer was large, which was considered to cause the occurrence of "repelling."

As described above in detail, in the present embodiment and the present examples, according to the first process, a state in which the electrode active material layer 8 in a wet state with a solid content ratio in a range of 70 to 85% was present on the collecting foil 7 was obtained. In this state, the second process was performed and the insulating particle paint 13 with a solid content ratio in a range of 35 to 50% was applied onto the electrode active material layer 8. Then, the contact angle of the insulating particle paint 13 on the electrode active material layer 8 at that time was set in a range of 10 to 40°. Therefore, an electrode plate including a favorable insulating particle layer 9 having no defect, having no mixing with the lower layer, and having high thickness uniformity was obtained. In this manner, a method of producing an electrode body or a battery through which it was possible to improve the wettability of the insulating particle paint 13 on the electrode active material layer 8 and form and sandwich the insulating particle layer 9 with a uniform thickness between positive and negative electrode plates was implemented.

Moreover, the present embodiment is only an example and does not limit the scope of the present disclosure. Accordingly, it should be noted that various improvements and modifications can be made without departing from the scope of the present disclosure. For example, a type of a battery to be applied is not limited to a lithium ion battery.

What is claimed is:

1. A method of producing an electrode body in which a first electrode plate having a structure including an electrode active material layer on a surface of a collecting foil and an insulating particle layer on a surface of the electrode active material layer, and a second electrode plate are laminated to obtain an electrode body of a battery, the method comprising:
    obtaining a state in which the electrode active material layer is present on the collecting foil, wherein the electrode active material layer is in a wet state, the electrode active material layer includes a first solid component containing electrode active material particles, and further includes a first liquid phase component that is volatilized by drying, and wherein a weight ratio of the first solid component in the electrode active material layer in the wet state being in a range of 70 to 85%; and
    applying an insulating particle paint onto the electrode active material layer in the wet state, the insulating particle paint including a second solid component containing insulating particles and further including a second liquid phase component that is volatilized by drying, and a weight ratio of the second solid component in the insulating particle paint being in a range of 35 to 50%, wherein a surface tension value of the first liquid phase component is in a range of 90 to 110% of a surface tension value of the second liquid phase component, and when the insulating particle paint is applied onto the electrode active material layer in the wet state, a contact angle of the insulating particle paint on the electrode active material layer in the wet state is in a range of 10 to 40°.

2. The method of producing the electrode body according to claim 1, wherein the electrode active material layer, that is in the wet state, is obtained to be present on the collecting foil by:

applying an electrode active material paint onto the collecting foil to form the electrode active material layer in the wet state, the electrode active material including the first solid component and the first liquid phase component, wherein the first solid component has a weight ratio in a range of 70 to 85%, and wherein the insulating particle paint is then applied onto the electrode active material layer in the wet state without a process of intentionally decreasing the first liquid phase component included in the electrode active material layer in the wet state.

3. The method of producing the electrode body according to claim 1, wherein, when the first electrode plate and the second electrode plate are laminated, the insulating particle layer and the second electrode plate face each other without another member sandwiched between the insulating particle layer and the second electrode plate.

4. The method of producing the electrode body according to claim 1, wherein, when the first electrode plate and the second electrode plate are laminated, the insulating particle layer and the second electrode plate face each other with a film separator sandwiched between the insulating particle layer and the second electrode plate.

5. The method of producing the electrode body according to claim 1, wherein the first electrode plate is a negative electrode plate of a lithium ion battery and the second electrode plate is a positive electrode plate of the lithium ion battery.

6. A method of producing a battery in which an electrode body is accommodated in a battery case together with an electrolyte solution and sealed, wherein the electrode body is produced using the method of producing the electrode body according to claim 1.

* * * * *